US007322321B2

(12) United States Patent
Robinson (10) Patent No.: US 7,322,321 B2
(45) Date of Patent: Jan. 29, 2008

(54) ENGINE VALVE ASSEMBLY HAVING HOLDING TANK WITH RETURN VALVE AND DISCHARGE VALVE IN THE VALVE ASSEMBLY

(76) Inventor: Barnett Joel Robinson, 227 California St., Newton, MA (US) 02458

( * ) Notice: Subject to any disclaimer, the term of this patent is extended or adjusted under 35 U.S.C. 154(b) by 101 days.

(21) Appl. No.: 11/409,753

(22) Filed: Apr. 24, 2006

(65) Prior Publication Data

US 2007/0246007 A1 Oct. 25, 2007

(51) Int. Cl.
*F02B 75/04* (2006.01)
(52) U.S. Cl. .................... 123/48 R; 123/256; 123/289; 123/568.11
(58) Field of Classification Search ............. 123/48 R, 123/256, 258, 259, 265, 285, 289, 292, 293, 123/568.11, 568.14
See application file for complete search history.

(56) References Cited

U.S. PATENT DOCUMENTS

3,878,826 A    4/1975  Date
4,192,265 A    3/1980  Amano
6,907,859 B1   6/2005  Robinson Primary Examiner—Stephen K. Cronin
Assistant Examiner—Katrina B. Harris
(74) Attorney, Agent, or Firm—David M Warren (57) ABSTRACT

An Elevated Expansion-Ratio Internal Combustion Engine has a substantially standard repeating four-stroke sequence for each of a plurality of cylinders. The head of each cylinder has an intake valve, a combustion-gas exhaust valve, and a vapor return valve. A return manifold for vapor connects from respective ones of the cylinders via a plurality of valve assemblies, each of which includes the return valve, into a passage ahead of a beginning portion of an intake manifold. Each valve assembly also has a discharge valve coupled to the return valve via a holding tank for cylinder vapor or gas. Valve stems of the discharge and return valves are coaxial in a single section valve housing or spaced-apart in a two-section valve housing. A quantity of the vapor is received into the holding tank during the compression stroke, and subsequently transferred via the discharge valve to the return manifold.

24 Claims, 6 Drawing Sheets

ENGINE VALVE ASSEMBLY HAVING HOLDING TANK WITH RETURN VALVE AND DISCHARGE VALVE IN THE VALVE ASSEMBLY

BACKGROUND OF THE INVENTION

This invention relates to a valve assembly and to an internal combustion engine incorporating the valve assembly, wherein the valve assembly has a plurality of valves, each with a valve head supported on a valve stem and a valve seat for receiving the valve head and, more particularly, to a form of construction of the valve assembly wherein the arrangement of the valve stems permits locating a holding tank for engine gasses within a cylinder head of the engine.

One form of valve that is in common use, such as in an automotive engine, has a valve head that rests on a valve seat during a closed position of the valve, the valve further comprising a stem that carries the valve head to and from the valve seat to accomplish a closing and an opening of the valve. As an example in the use of such a valve in the construction of a cylinder head of an internal combustion engine, an intake valve and also an outlet valve located in the cylinder head have this form of construction, namely, a valve head carried by a valve stem with displacement along an axis of the valve stem to lower the valve head onto a seat, formed within the cylinder head, to close the valve; and wherein displacement along the axis of the valve stem in the reverse direction lifts the valve head from the seat to open the valve. The intake valve controls flow of engine gasses between the combustion chamber and an intake manifold, and the outlet (or exhaust) valve controls flow of engine gasses between the combustion chamber and an exhaust manifold, wherein both of the intake and the exhaust manifolds are connected to the cylinder head.

An internal combustion engine of particular interest herein is disclosed in U.S. Pat. No. 6,907,859 issued to B. J. Robinson, the inventor herein. Information on the construction of an engine, disclosed in the Robinson patent, is incorporated herein by reference. In the engine of the Robinson patent, there are further valves in addition to the intake and the outlet valves. The further valves include a return valve and a discharge valve. The return valve closes and opens a passage between the internal space of a cylinder and a holding tank, and the discharge valve closes and opens a passage between the holding tank and a return manifold. In the Robinson patent, the holding tank is formed within an arm of the return manifold, the return valve is located in a return port of the cylinder head at an outboard end of the manifold arm, and the discharge valve is located at the inboard end of the manifold arm adjacent to a central chamber of the return manifold. In the Robinson patent, the function of the holding tank, in conjunction with the additional valves and the return manifold, is to give the engine an elevated expansion ratio while simultaneously being able to reduce the compression ratio for additional fuel savings.

Other examples of engines employing additional manifolds and valves are presented in Date, U.S. Pat. No. 3,878,826, and Amano, U.S. Pat. No. 4,192,265.

In order to facilitate construction of an engine requiring the holding tank and additional valves, such as the engine of the Robinson patent, it is believed that it would be advantageous to reconfigure the cylinder head to include within the cylinder head, in addition to the intake and the outlet valves, also the return and the discharge valves with the holding tank. This would enable these components of the engine to be assembled as part of the cylinder head, and then the completed cylinder head would be joined to the cylinder block, the three manifolds (intake, exhaust and return), and other parts of the engine system.

SUMMARY OF THE INVENTION

The foregoing advantage in construction of an engine, embodying the holding tank with return valve and discharge valve along with intake and exhaust valves, is attained, and other advantages are provided, by a valve assembly employing plural valves with a holding tank, in accordance with the invention, wherein valve heads and their respective valve stems are arranged within a housing to define a space within the interior of the housing for the holding tank. A void is constructed within the interior space of the housing to serve as the holding tank.

In a first embodiment of the invention, the return valve and the discharge valve are provided with coaxial valve stems, such that the return valve stem extends through the holding tank to place the return valve head at an entrance to the holding tank, while the discharge valve head is located at an exit of the holding tank. By virtue of the coaxial arrangement of the valve shafts, the valve stems can be displaced relative to each other and to the valve housing by a sliding motion along a common shaft axis, wherein one of the shafts serves as a guide for the other of the shafts. Return springs, for urging the stems of the return and the discharge valves, are provided in a configuration that accommodates the coaxial arrangement of the valve stems.

While such a valve assembly can be employed in various configurations of hydraulic systems, it is readily adapted to become a part of the foregoing elevated-expansion-ratio engine embodying the holding tank with return valve and discharge valve. This is accomplished by constructing the valve assembly with an inner valve stem carrying a valve head serving as the return valve, and an outer valve stem carrying a valve head serving as the discharge valve. The outer valve stem serves as a guide for positioning the inner valve stem, while permitting the inner valve stem to slide relative to the outer valve stem. The outer valve stem is positioned, in turn, within an outer guide provided along an interior surface of the valve housing, the outer guide permitting the outer valve stem to slide relative to the valve housing.

The valve assembly is located within the head of a cylinder of the engine such that the return valve, upon separation ("lifting") from its seat, moves into the interior space of a combustion chamber and towards a piston located in the cylinder. The head of the discharge valve is positioned by the outer valve stem at a location sufficiently far behind the head of the return valve to provide clearance between the valve heads at all possible locations of one valve head relative to the other valve head. Within the holding tank, a ribbing extends from a wall of the housing to support a valve seat for the discharge valve. It is preferred that the ribbing have a conical shape for rigidity in providing a secure support for the discharge valve seat. The ribbing, in conjunction with the discharge valve seat and discharge valve head serve to form a discharge port for directing gases from the holding tank into the return manifold of the engine. Also, the head and the seat of the return valve constitute a return port for passage of gases from the cylinder to the holding tank.

Furthermore, in the first embodiment of the invention, the inner valve stem has the shape of a rod, while the outer valve stem has the shape of a cylinder. These shapes of the valve stems facilitate engagement of the valve stems with cams of a camshaft that serve to drive the valve stems toward the engine cylinder. Two return springs are provided, a first of the return springs contacting the outer valve stem and a second of the return springs contacting the inner valve stem, for retracting the valve stems away from the engine cylinder upon further rotation of the camshaft. The distal, or top, end (away from the engine cylinder) of the inner valve stem is configured for contacting a cam of the camshaft. The top end of the outer valve stem is configured for contacting two cams located on opposite sides of the cam for the inner valve stem. By way of alternative embodiment of the invention, not a preferred embodiment, one of the two cams can be deleted, so that the outer valve stem is driven by only one cam. In the preferred configuration of the first embodiment, the first return spring encircles the outer valve stem in a recess between the outer valve stem and the housing of the valve assembly, and is compressed by a ridge on the outer surface of the outer valve stem and a ridge on the housing. For engagement of the second return spring with the inner valve stem, windows are cut through both of the valve stems. The second return spring extends from a shelf on one side of the housing through the windows to a further shelf on the opposite side of the housing, and engages with the upper end of the window of the inner valve stem to urge the inner valve stem against its cam.

In a second embodiment of the invention, the valve stems of the return valve and the discharge valve are spaced apart transversely from each other so as to enable the stem of the return valve to pass outside of the holding tank for placing the return valve head at an entrance to the holding tank, while the discharge valve head is located at an exit of the holding tank. This arrangement of the valve stems permits a standard form of retraction (return) spring to be used for each of the return valve stem and the discharge valve stem.

In both embodiments of the invention, the engine cylinder head provides the housing for the valve assembly. However, in the first embodiment of the invention, the housing is formed as a single unitary unit while, in the second embodiment of the invention, the housing is formed of two sections, namely, an upper section of the cylinder head and a lower section of the cylinder head, wherein the lower section is positioned between the upper section and the combustion chambers of the engine. In the second embodiment, the holding tank is located at the interface between the two sections. Thereby, during assembly of the cylinder head, prior to a joining of the two sections via a gasket, access is available to the interior of the holding tank for insertion of the discharge valve into the upper section of the housing. This facilitates construction and permits a standard form of return spring to be employed for each of the return and the discharge valves.

Also, in each of the embodiments, the holding tank may be regarded as an extension of the combustion chamber in an interval of time, during the compression stroke, when the return valve is open. The holding tank is formed with a desired amount of interior volume, depending on the amount of space desired for holding the gases driven out of the combustion chamber via the return valve during the compression stroke of the piston, as is explained in the Robinson patent. Typically, in the case of a gasoline engine, the volume of the holding tank is equal to approximately one half of the volume of the engine cylinder (maximum volume when the piston is as bottom dead center, namely, the size of the combustion chamber). However, in the practice of the invention, the valve assembly can be provided with some other amount of volume in the holding tank, depending on how the designer of the engine wants to affect operation of the engine. For example, the volume of the holding tank might have any volume within a range of approximately ten percent to ninety percent of the combustion chamber volume for a gasoline engine, and within a range of approximately three percent to fifty percent of the combustion chamber volume for a diesel engine.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION OF THE INVENTION

The invention provides for a valve assembly wherein a housing of the valve-assembly encloses both the return valve and the discharge valve along with the holding tank, with these three components being positioned in an arrangement giving the housing a sufficiently narrow shape for its location in the cylinder head along with the intake and exhaust valves. Furthermore, the valve assembly provides for direct connection via the return valve to the interior space of the engine cylinder, permits independent timing of the operations of the return valve and the discharge valve, and enables a driving of the return valve and the discharge valve from the cams of a single cam shaft. This facilitates incorporation of the invention into existing engine designs.

In order to appreciate the need for these features, a description of an internal combustion engine with elevated expansion ratio, corresponding to the description in the Robinson patent, is presented now.

A form of the internal combustion engine, generally used for powering automobiles, operates in accordance with the Otto cycle, and may be referred to herein as a gasoline engine, as distinguished from a diesel engine. The gasoline engine employs one or more cylinders, each cylinder having a piston movable therein with reciprocating motion for the driving of a crankshaft of the engine. Output power of the engine, for the driving of a load, is obtained from the rotating crankshaft. In the four-stroke form of the gasoline engine, the movement of a piston in its cylinder is characterized by four strokes, which occur in a repeating sequence, the sequence of the four strokes being: an induction stroke, a compression stroke, a power (or expansion) stroke, and an exhaust stroke. During the induction stroke, the piston moves away from the head of the cylinder to produce a vacuum that draws in a mixture of air and fuel vapors via an intake valve generally located in the head of the cylinder. During the compression stroke, the piston moves towards the cylinder head to compress the air-fuel mixture. Approximately at the beginning of the power stroke, there is ignition of the air-fuel mixture and, during the power stroke, the expanding gases produced by the combustion of the fuel drive the piston away from the cylinder head. During the exhaust stroke, the piston moves towards the cylinder head to drive the exhaust gases out of the cylinder via an exhaust valve generally located in the cylinder head. In the usual construction of such an engine, an intake manifold is provided for bringing air and fuel from a carburetor or fuel-injection assembly to the intake ports of respective ones of the cylinders, and an exhaust manifold is provided for removal of combustion gases via exhaust ports of the respective cylinders.

It is useful to compare operation of the gasoline engine with the diesel engine. In the case of the gasoline engine, both fuel and air are present in the cylinder during the compression stroke. The temperature produced in the gases within the cylinder is below the ignition temperature of the air-fuel mixture so as to avoid premature ignition of the air-fuel mixture. Ignition is produced by an electric spark of a spark plug, mounted within the cylinder head. In a modern engine, activation of the spark plug at an optimum moment, relative to the time of occurrence of the power stroke, is provided by a computer. In the case of the diesel engine, only the air is present in the cylinder during the compression stroke. The geometry of the piston within the cylinder of the diesel engine differs somewhat from the corresponding geometry of the gasoline engine such that the compression stroke of the diesel engine provides significantly more compression of the gases within the cylinder (a compression ratio of approximately 15:1) than occurs in the gasoline engine (a compression ratio of approximately 8:1). As a result, in the diesel engine, the temperature of the air is raised by the compression stroke to a temperature high enough to ignite fuel. Accordingly, in the diesel engine, the fuel is injected into the cylinder at approximately the beginning of the power stroke, and is ignited by the high air temperature.

It is observed furthermore, that in the usual construction of a gasoline engine and of a diesel engine, the ratio of the expansion of the volume of cylinder gases, final volume divided by initial volume of the power stroke, is equal to the ratio of the compression of the volume of the cylinder gases, initial volume divided by final volume of the compression stroke. By way of example, for engines without the feature of elevated expansion ratio provided in the Robinson patent, compression and expansion for a gasoline engine is characterized by a ratio having a typical value of approximately 8:1 (such engines being available with ratios in a range of approximately 8:1 to 10:1), and for a diesel engine, compression and expansion is characterized by a ratio having a typical value of approximately 15:1 (such engines being available with ratios in a range of approximately 15:1 to 22:1). The expansion of the cylinder gases in the power stroke is accompanied by a reduction in the temperature of the cylinder gases. Well-known theoretical considerations show that an important consideration in determining the efficiency of the engine is the ratio of the gas temperature at the beginning of the power stroke to the gas temperature at the end of the power stroke. A greater temperature ratio is obtained in the case of the diesel engine than for the gasoline engine. This is one of the reasons that the diesel engine can operate more efficiently than the gasoline engine.

Figure 1:
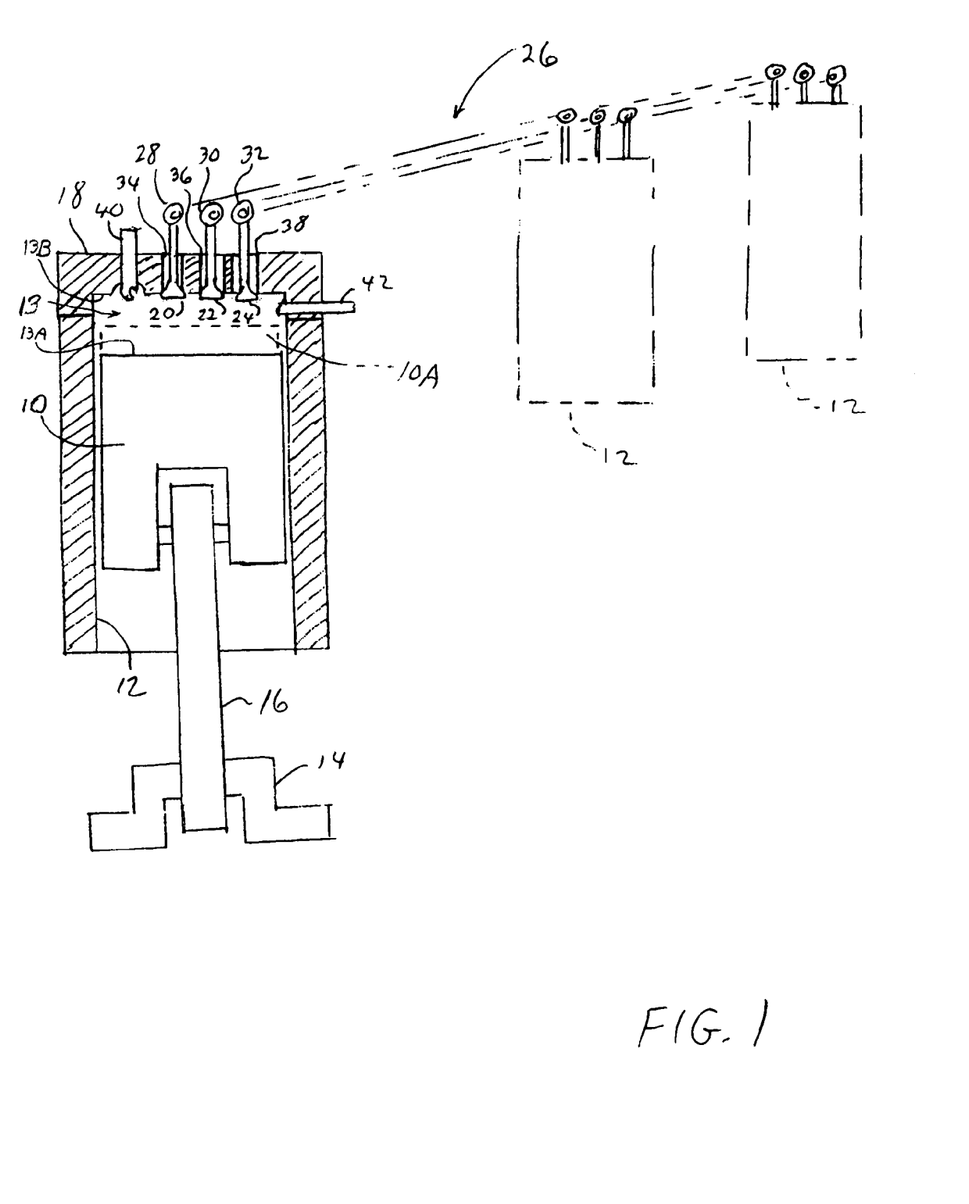
FIG. 1 shows a stylized view of an internal combustion engine to be operated with an elevated expansion ratio, as taught in the aforementioned Robinson patent.

FIG. 1 shows a diagrammatic view of a piston 10 within its cylinder 12. The piston 10 is driven with reciprocating motion by a crankshaft 14 and a connecting rod 16, wherein the motion of the piston 10 is characterized by a repeating sequence of four strokes, as described above. The piston 10 and the cylinder 12 define a combustion chamber 13 which extends within the cylinder 12 from a top surface 13A of the piston 10 to the interior surface 13B of a head 18 of the cylinder 12. During the induction stroke and the power (or expansion) stroke, the distance between the piston 10 and the cylinder head 18 increases to provide for an increase in the volume of cylinder, and of the combustion chamber 13, available for containing gases within the cylinder. During the compression and the exhaust strokes, the distance between the piston 10 and the head 18 decreases to provide for a decrease in the volume of the cylinder, and of the combustion chamber 13, available for the containment of gases within the combustion chamber 13.

It is interesting to note the effect, on the compression ratio, of a change in the geometry of the piston 10 relative to the cylinder 12 by increasing the length of the piston 10 to provide for a taller piston 10A as indicated in dashed line. Typically, in the construction of the cylinder head 18, the interior of the head 18 may be provided with a complex shape to enhance combustion within the cylinder 12; however, for an understanding of the present invention, the interior of the cylinder head 18 may be represented by the more simple shape of a right circular cylinder as shown in FIG. 1.

By way of example in the construction of the piston 10, 10A within its cylinder 12, in the case of a gasoline engine operating with the four-stroke process, when the piston in the cylinder is at top dead center, there is 1 cm (centimeter) between piston-top and the head. If the length of a stroke is 7 cm, then bottom dead center is 8 cm from piston to head, this resulting in a compression stroke with 8:1 compression ratio and a power stroke expansion ratio of 8:1. The diesel engine four-stroke cycle differs from this pattern only by having a higher compression ratio and a correspondingly higher expansion ratio.

In the foregoing example, one may consider making the piston 10A to be 0.5 cm taller than the piston 10. This changes the geometric ratio from a value of (8 cm to 1 cm), with corresponding compression and expansion ratios of 8:1, to a geometric ratio of (7.5 cm to 0.5 cm) with a corresponding expansion ratio of 15:1 in the power stroke. In the case of an engine having the feature of the elevated expansion ratio of the Robinson patent, that feature can prevent the compression ratio of the compression stroke from rising above 8:1 by use of the return valve with holding tank and discharge valve for releasing some of the gases (or vapor) in the cylinder during the beginning of the compression stroke. The result is that the compression stroke retains its compression ratio of approximately 8:1 (assuming that the return valve closes when the piston position is half way through the compression stroke) while the expansion stroke has the aforementioned expansion ratio of 15:1. By this usage of different ratios in the compression and the expansion strokes, the engine with the elevated expansion ratio may be said to change an engine's operational aspect ratio of expansion ratio to compression ratio from today's regular industrial standard of 1:1 to an elevated level of about 2:1, or even 3:1, in gasoline engines.

In the case of the diesel engine, wherein the elevated temperature produced by the relatively high compression of the air is responsible for ignition of the fuel, the elevation in the foregoing aspect ratio in diesel engines may be less that 2:1. However in the cases of both the gasoline engine and the diesel engine, in the elevated-expansion-ratio engine, there would be an "elevated" aspect ratio of greater than 1:1.

FIG. 1 also shows an intake valve 20, an exhaust valve 22 and a return valve 24 located in the cylinder head 18, these three valves being present in both the gasoline and the diesel forms of an engine 26 constructed with the piston 10A and the cylinder 12. Three camshafts 28, 30 and 32 are provided for operation of the valves 20, 22 and 24, respectively. It is understood that the three camshafts are provided by way of example, and that, by way of further example, a single camshaft with two cams thereon may be employed for operation of two of the foregoing valves, or possibly a single camshaft with three cams thereon may be employed for operation of all three of the valves. Also, it is understood that the stylized representation of FIG. 1 presents the arrangement of the three valves in a line to facilitate explanation of the invention, and that the actual positioning of these valves in a preferred embodiment of the invention may differ from the indicated linear arrangement.

The intake valve 20 is operative to close and to open an intake port 34 of the head 18. The exhaust valve 22 is operative to close and to open an exhaust port 36 of the head 18. The return valve 24 is operative to close and to open a return port 38 of the head 18. Also shown in FIG. 1 is a spark plug 40 for ignition of gases in the cylinder 12 in the case of the gasoline engine and, as an alternative form of construction, FIG. 1 also shows a fuel injector 42 for injecting fuel into the heated air at the beginning of the power stroke for the case of the diesel engine. Additional cylinders 12 of the engine 26 are indicated in phantom.

Figure 2:
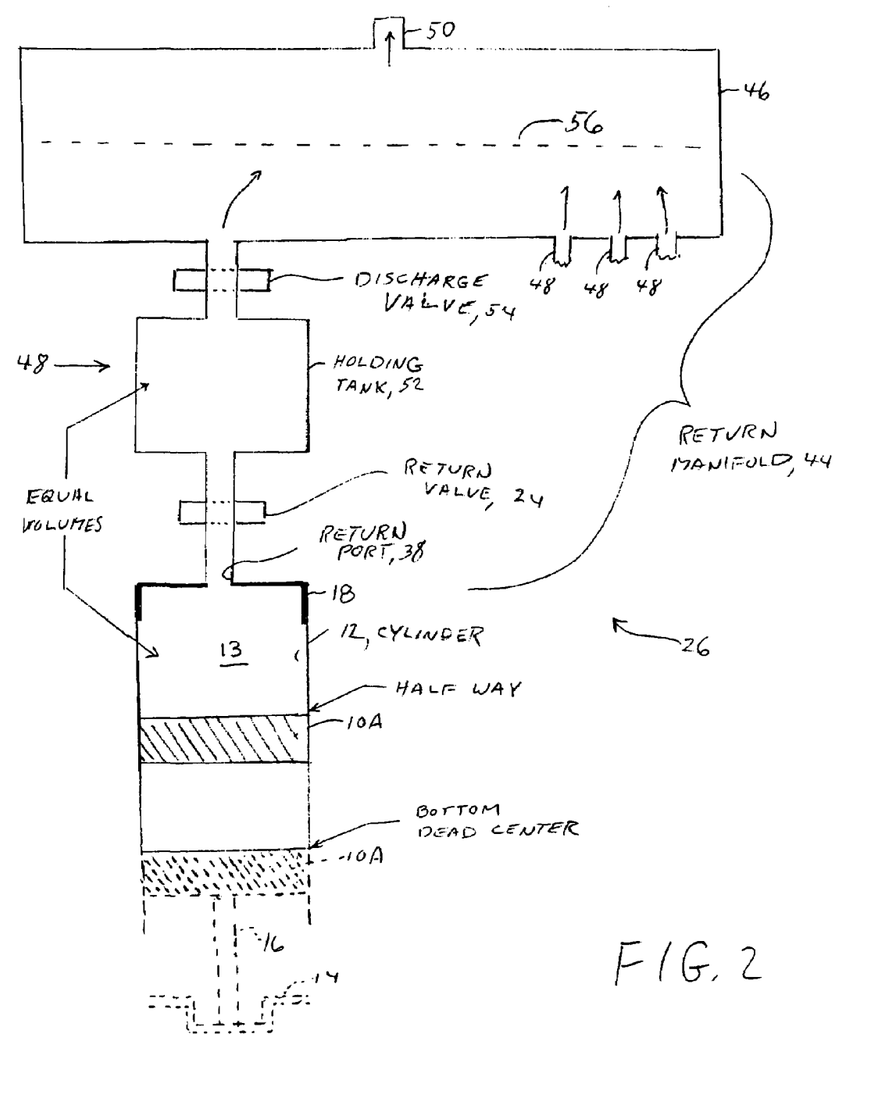
FIG. 2 shows diagrammatically details in the construction of a return manifold connected to a cylinder of the engine of FIG. 1, as taught in the aforementioned Robinson patent.

FIG. 2 shows a simplified view of the cylinder 12 and its connection with a return manifold 44 of the engine 26. In the cylinder 12, the piston 10A is being driven during a compression stroke from its position at bottom dead center towards the cylinder head 18, and is shown at the halfway point. The return manifold 44 comprises a central chamber 46 with a plurality of arms 48 extending from the central chamber 46 to respective ones of the cylinders 12 of the engine 26. An outlet passage 50 is provided on the central chamber 46 for directing return gases from the return manifold 44, in the case of the gasoline engine, to the location at the carburetor or fuel injection assembly (not shown in FIG. 2) in which the return gases join the stream of the air-fuel mix heading toward an inlet of the intake manifold (not shown in FIG. 2). Arrows show the direction of gas flow within the central chamber 46.

Each of the arms 48 has the same construction, which construction in shown for one of the arms 48 in the figure. The arm 48 has sufficient internal volume to serve as a holding tank 52 for a quantity of the cylinder gases passed from the cylinder 12 into the arm 48 during a portion of the compression stroke of the piston 10A. One end of the holding tank 52, at the outboard end of the arm 48, connects via the return valve 24 and the return port 38 to the cylinder 12. The other end of the holding tank 52, at the inboard end of the arm 48, connects via a discharge valve 54 to the central chamber 46.

In the operation of the arm 48, prior to inception of the compression stroke, the discharge valve 54 closes to prevent any flow of vapor or gases between the holding tank 52 and the central chamber 46. The return valve 24 is opened, at the commencement of the compression stroke, to provide for communication between the interior space of the combustion chamber 13 and the interior space of the holding tank 52. Then, during the compression stroke, as the piston 10A advances towards the head 18, the piston 10A pushes gases from the combustion chamber 13 via the return port 38 into the holding tank 52. These gases cannot escape from the holding tank 52, because of the closure of the discharge valve 54.

By way of example in the construction of the arm 48 for implementing an engine with the feature of elevated expansion ratio, the interior volume of the holding tank 52 may be made equal to one-half of the amount of the interior volume of the combustion chamber 13 when the piston 10A is at bottom dead center. When the piston advances to a position half way toward the cylinder head 18, the position shown in FIG. 2, the volume of the combustion chamber 13, located between the piston and the head, is equal to the volume of the holding tank 52. Therefore, for the situation depicted in FIG. 2, half of the gases originally present in the combustion chamber 13 have been moved to the holding tank 52. In the operation of the compression stroke, as the piston 10A passes the halfway point, the return valve 24 closes to prevent further egress of the gases from the cylinder 12. It is recalled that the piston 10A of the modified cylinder is taller than the piston 10 (as described above in FIG. 1) of the unmodified cylinder. The removal of the foregoing quantity of engine gases from the cylinder 12 into the holding tank 52 compensates for the greater height of the piston 10A so as to produce, at the end of the compression stroke, a pressure and temperature in the cylinder gases which is substantially the same as that which is found in the operation of the unmodified cylinder.

By way of review, it is noted that the modification of the engine 26 provided in FIG. 1 considers the situation wherein the piston is at top dead center, and the piston height is raised sufficiently so as to half the cylinder space with the piston at top dead center. Reducing the volume of the compressed gas by a factor of two raises the pressure and temperature of the gas well above the values of pressure and temperature found in the unmodified engine. The removal of half of the engine gases by means of the holding tank 52, as described in FIG. 2, restores the values of pressure and temperature to those of the unmodified engine.

By way of example in operational aspects for an engine with the feature of the elevated expansion ratio, as shown in FIG. 2, the central chamber 46 of the return manifold 44 may be provided with a mesh 56 extending across the chamber 46 at a location between the outlet passage 50 and the set of arms 48. The mesh 56 functions as an acoustic baffle, analogous to a corresponding structure in a muffler, to reduce pulsations in the speed and pressure of gases applied to the central chamber 46 by respective ones of the arms 48. Further operational aspects of the engine with the feature of the elevated expansion ratio are described in the Robinson patent.

In the ensuing description, details in the construction of the first embodiment of the invention are described with reference to FIGS. 3 and 4. This is followed by details in the construction of the second embodiment presented with reference to FIGS. 5 and 6. Both embodiments provide for connection to a holding tank via a return valve and a discharge valve. In both embodiments, the discharge valve is at an end of the holding tank relatively distant from the combustion chamber while the return valve head is at an end of the holding tank adjacent to the combustion chamber. In the first embodiment of the invention, the valve stem of the return valve passes through the holding tank to reach the head of the return valve, and the valve stem of the return valve is coaxial with the valve stem of the discharge valve. In the second embodiment of the invention, the stem of the return valve is offset from the stem of the discharge valve and passes outside of the holding tank.

Figure 3:
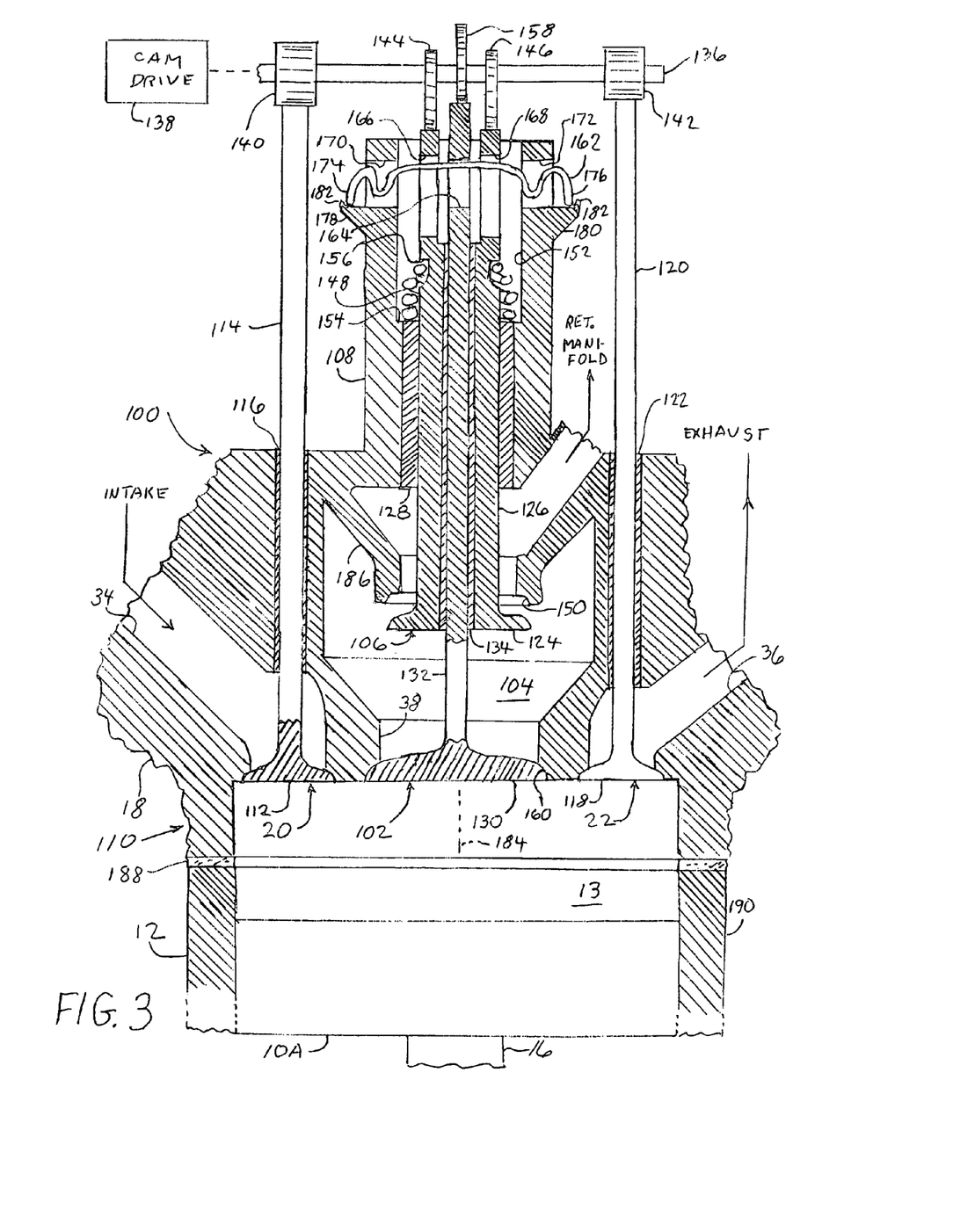
FIG. 3 is a stylized sectional view of a valve assembly of the invention, in accordance with the first embodiment of the invention, having components disclosed in FIG. 2, and being located within a cylinder head.
Figure 4:
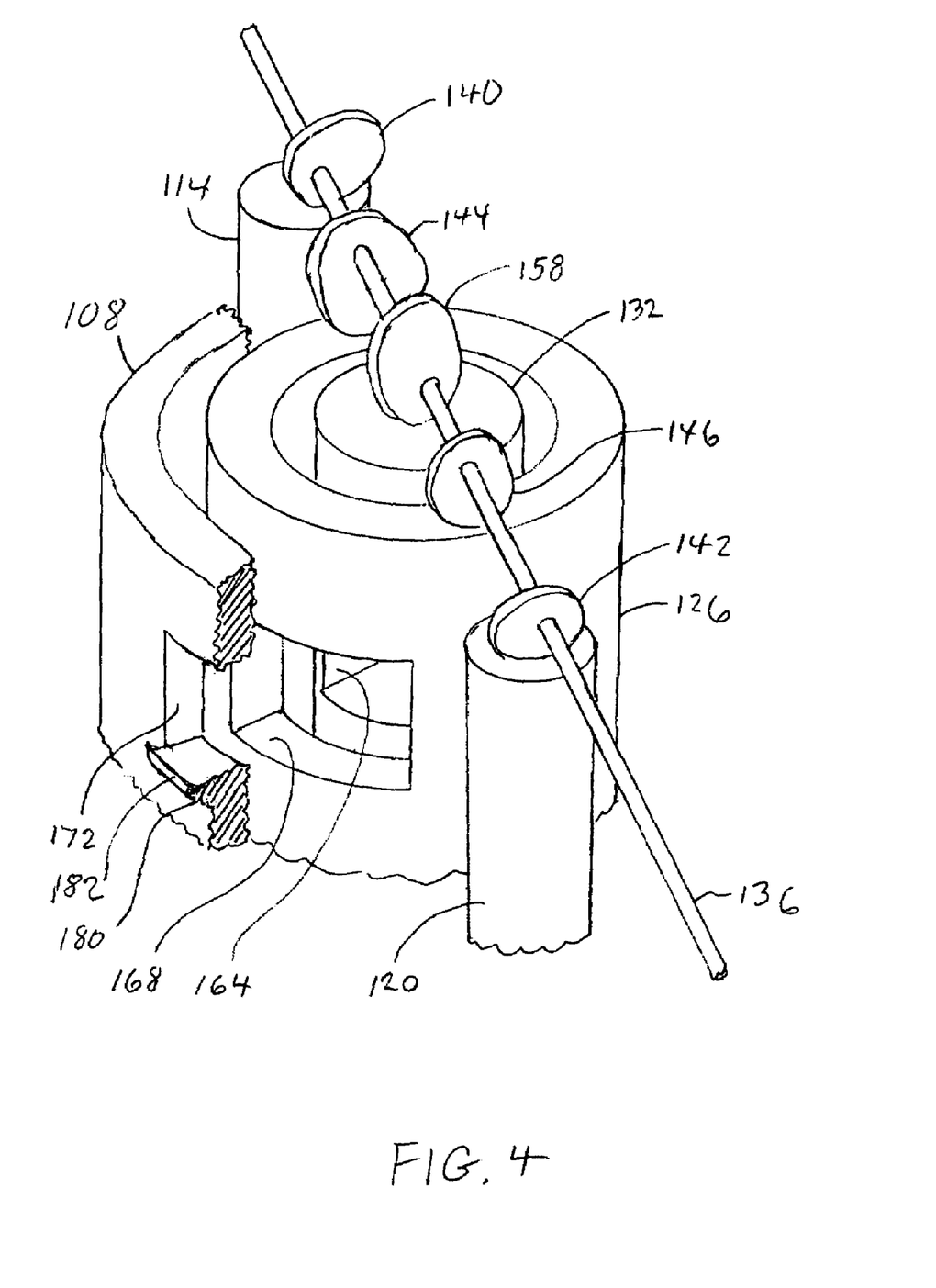
FIG. 4 is a fragmentary stylized perspective view of valve shafts in the assembly of FIG. 3, the figure being simplified by deletion of a spring of the valve assembly.

FIG. 3 shows the construction of the valve assembly 100 in accordance with the first embodiment of the invention. The valve assembly 100 comprises a return valve 102, a holding tank 104, and a discharge valve 106 that correspond, respectively, to the return valve 24, the holding tank 52, and the discharge valve 54 described above with reference to FIG. 2. As shown in FIG. 3, the return valve 102, the holding tank 104, and the discharge valve 106 are enclosed within a housing 108 of the valve assembly 100. The housing 108 is integrated with the cylinder head 18 (shown also in FIG. 1) to form a unitary structure therewith. The housing 108 is located between the intake valve 20 (shown also in FIG. 1) and the exhaust valve 22 (shown also in FIG. 1) that are also located within the cylinder head 18. Typically, in the construction of the engine 26 (shown in FIGS. 1 and 2) of a plurality of the cylinders 12, the cylinders 12 are arranged contiguous one another within a common block referred to as a cylinder block, and the cylinder head 18 covers the respective cylinders 12 of the cylinder block. The portrayal of the valve assembly 100 in FIG. 3 is understood to represent one of a plurality of such valve assemblies in an engine 110 having multiple cylinders 12. In the engine 110, the corresponding array of valve assemblies 100 would be part of the cylinder head.

FIG. 3 provides more detail in the construction of the cylinder head 18 than does FIG. 1. As shown in FIG. 3, the intake valve 20 comprises a valve head 112 carried by valve stem 114 guided for translational movement by a guide 116, formed as a bearing sleeve and located within the housing 108. The exhaust valve 22 comprises a valve head 118 carried by valve stem 120 guided for translational movement by a guide 122, formed as a bearing sleeve and located within the housing 108. The discharge valve 106 comprises a valve head 124 carried by a hollow cylindrical valve stem 126 guided for translational movement by a guide 128, formed as a bearing sleeve and located within the housing 108. The return valve 102 comprises a valve head 130 carried by a valve stem 132 guided for translational movement within an inner bearing sleeve 134 of the hollow stem 126.

All of the valve stems translate with reciprocating movement in the vertical direction, relative to the view of FIG. 3, the reciprocating movement being provided by a camshaft 136 being driven in rotation by a conventional mechanism represented in the figure by a cam drive 138. Cams 140 and 142 (shown also in FIG. 4) each constitute a part of the camshaft 136, and contact respectively the intake and exhaust valve stems 114 and 120 at the top (relative to the view of FIG. 3) of each valve stem 114 and 120 for urging the valve stems toward the piston 10A in the cylinder 12, upon rotation of the camshaft 136. Springs (not shown in FIG. 3) are provided for each of the valve stems 114 and 120 for holding the valve stems 114 and 120 in contact within the respective cams 140 and 142, and for retracting the valve stems 114 and 120 away from the piston 10A upon further rotation of the camshaft 136.

The camshaft 136 further comprises a pair of cams 144 and 146 (shown also in FIG. 4) which drive the valve stem 126 of the discharge valve 106 downwards toward the piston 10A, against the force of a retraction spring 148, to lift the head 124 from the seat 150, and thereby to open the discharge valve 106. The spring 148 is constructed as a coil. The spring 148 is located in a recess 152 between the valve stem 126 and the housing 108 and sits within a shelf 154 of the housing 108. The top of the spring 148 is located within a notch 156 encircling the discharge valve stem 126 to exert a force on the valve stem 126 to push it up against the cams 144 and 146 for retracting the valve head 124 into the valve seat 150, thereby to close the discharge valve 106.

A further cam 158 (also shown in FIG. 4) of the camshaft 136 is centered between the cams 144 and 146 to contact the top of the return valve stem 132 and, upon rotation of the camshaft 136, serves to drive the valve stem 132 downwards toward the piston 10A to lift the valve head 130 from its valve seat 160, thereby to open the return valve 102. A further spring 162 serves to hold the valve stem 132 against its cam 158 for retracting the valve head 130 into its seat 160 to close the return valve 102 upon further rotation of the camshaft 136. Access to the return valve shaft 132 for the spring 162 is provided by a set of windows through which the spring 162 passes. The set of windows includes a central window 164 within the return valve stem 132, a pair of diametrically opposed windows 166 and 168 within the discharge valve stem 126, and a further pair of diametrically opposed windows 170 and 172 within the housing 108. The windows 164, 168 and 172 are shown also in FIG. 4. Opposed ends 174 and 176 of the spring 162 are supported on bottom surfaces of the windows 170 and 172 and on shelves 178 and 180 extending respectively from the bottom surfaces of the windows 170 and 172. Ribs 182 protrude upwardly from the outer edges of the shelves 178 and 180 to secure the ends 174 and 176 of the spring 162 against slippage out of the housing windows 170 and 172.

FIG. 3 shows the return valve stem 132 in its highest position wherein the valve head 130 is in contact with its valve seat 160. The discharge valve stem 126 is shown in its lowest position wherein the valve head 124 is spaced away from its valve seat 150. The height of the return valve stem 132 is greater than the height of the discharge valve stem 126 to insure that the return-valve cam 158 always clears the top of the discharge valve stem 126 for all positions of the valve stems 126 and 132 relative to each other. Thus, the return-valve stem 132, at its highest position, is closer to the camshaft 136 than is the discharge-valve stem 126 at its highest position. To accommodate the discharge-valve cams 144, 146 and the return-valve cam 158 to the differences in height of the discharge and return valve stems, the nominal diameter of each of the discharge-valve cams 144 and 146 is larger than the nominal diameter of the return-valve cam 158.

A feature in the construction of the valve assembly 100 is the circular cylindrical symmetry of an upper portion of the housing 108, the discharge valve stem 126 and the return valve stem 132 about a central axis 184 of the valve assembly 100. This permits the return spring 162 with the windows for its passage through the valve stems to be oriented along a line parallel to the camshaft 136, as shown in FIG. 3, or along a line angled relative to the camshaft 136 as shown in FIG. 4. Also, this configuration of the housing and the valve stems enclosed by the housing permits use of a single camshaft, such as the camshaft 136 oriented as shown in FIG. 4, to drive all four of the valve stems 114, 120, 126 and 132, or to reorient the camshaft so as to have the three separate camshaft 28, 30 and 32 as depicted in FIG. 1.

The aspect of the cylindrical symmetry is employed also in the construction of the discharge valve seat 150 upon a conically shaped support 186. The support 186 depends from an upper portion of the cylinder head 18 to form a roof of the holding tank 104, and to position the valve seat 150 along the central axis 184. Thereby, the valve assembly 100 is configured to be incorporated into engine heads of differing configurations, and the resulting engine head is readily secured to a cylinder block by a conventional head gasket 188.

In the construction of the valve assembly 100, the diameter of the return valve seat 160 is larger than the diameter of the discharge valve head 124 to permit insertion of the discharge valve 106 into the housing 108 via the opening in the cylinder head 18 provided by the return valve seat 160. This is followed by insertion of the return valve stem 132 through the same opening to be received by the hollow discharge valve stem 126. Thereafter, the discharge valve spring 148 can be inserted into the recess 152 by entry at the top of the housing 108, followed by insertion of the return valve spring 162 via the set of windows at the top of the housing 108. With respect to the lengths of the windows 166 and 168, as measured along the axis of the discharge valve stem 126, the top and bottom surfaces of each of the windows 166 and 168 in the discharge valve stem 126 are positioned to clear the return valve spring 162 for all possible positions of the return valve stem 132 relative to the position of the discharge valve stem 126. The widths of the return valve stem window 132, and of the discharge valve stem windows 166 and 168 are substantially larger than the width of the return spring 162 to permit rotational movement of the return valve 102 and the discharge valve 106 about the axis 184 to facilitate a seating of the respective valve heads 130 and 150 in the valve seats 160 and 150 during operation of the engine 110. Also, it is noted that the tops of the discharge and the return valve stems 126 and 132 have a configuration and arrangement permitting contact directly with cams of a camshaft, as shown in FIGS. 3 and 4, or alternatively, via rocker arms (not shown) to a camshaft depending on the layout of components of the engine 110.

Figure 5:
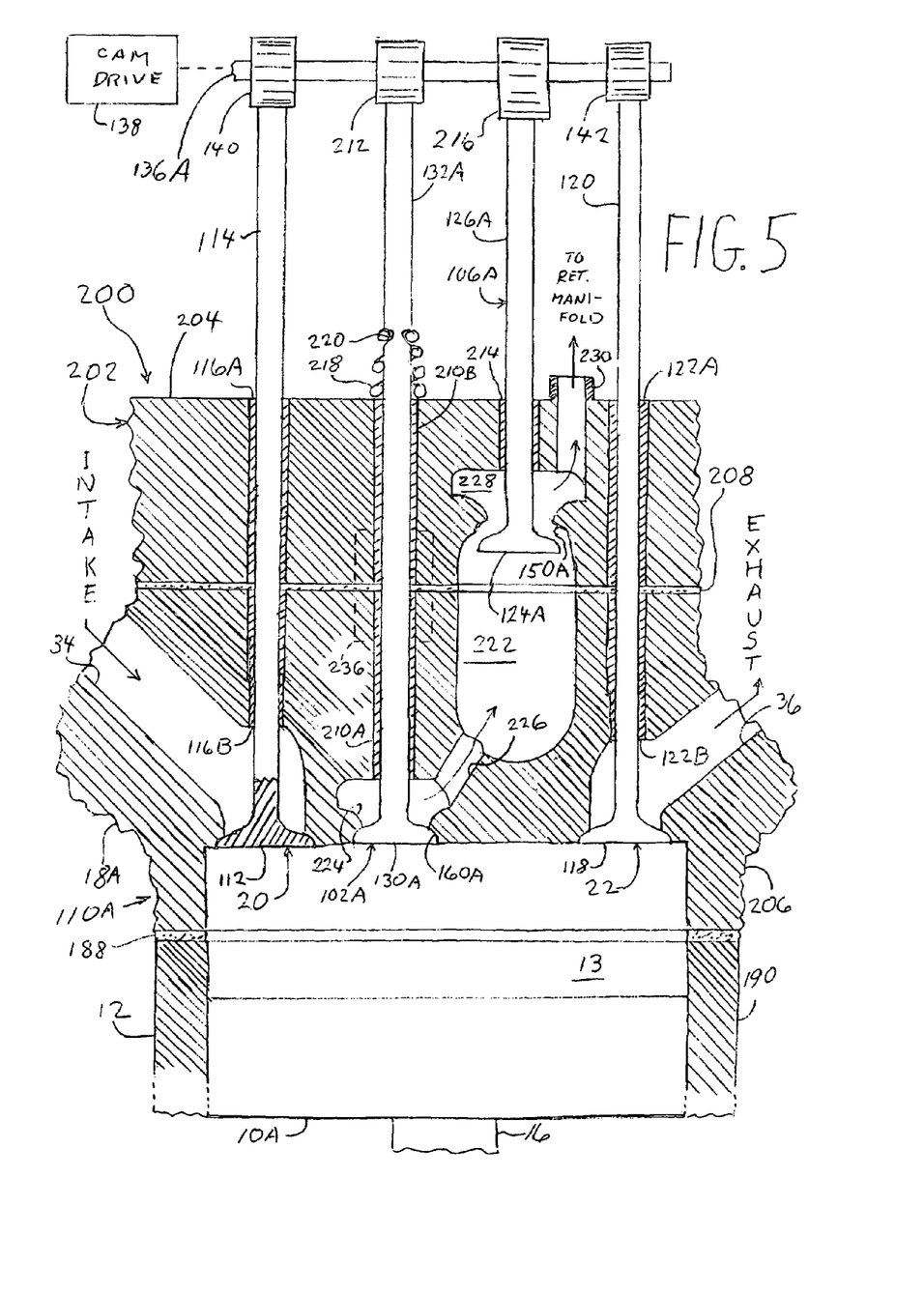
FIG. 5 is a sectional view a valve assembly of the invention, including some of the components of FIG. 3, and further showing an arrangement of return valve, discharge valve, and holding tank in accordance with the second embodiment of the invention.

With respect to the second embodiment of the invention, FIG. 5 shows construction of an engine 110A having a cylinder head 18A with a valve assembly 200. A housing 202 of the valve assembly 200 is constructed of an upper section 204 and a lower section 206 which are connected via a gasket 208 located at an interface between the two housing sections 204 and 206. Some of the engine components shown in FIG. 5 are essentially the same as corresponding components shown in FIG. 3 and, for convenience, are identified by the same reference numerals in both of the drawing figures. The lower housing section 206 connects via the gasket 188 to the cylinder block 190, the cylinder block 190 including the cylinder 12 and the piston 10A (previously described with reference to FIG. 3) which, in conjunction with the lower housing section 206, define the combustion chamber 13.

The lower section 206 of the housing 202 includes the intake port 34 connecting with the combustion chamber 13 via the head 112 of the intake valve 20, and the exhaust port 36 connecting with the combustion chamber 13 the head 118 of the exhaust valve 22. The stem 114 of the intake valve 20 extends via valve guides 116B and 116A, respectively, in the housing sections 206 and 204 to contact the cam 140 on a camshaft 136A driven by the drive 138. The stem 120 of the exhaust valve 22 extends via valve guides 122B and 122A, respectively, in the housing sections 206 and 204 to contact the cam 142 on the camshaft 136A driven by the drive 138.

The valve assembly 200 further comprises a return valve 102A with a stem 132A that extends via valve guides 210A and 210B, respectively, in the housing sections 206 and 204 to contact a cam 212 on the camshaft 136A. A head 130A of the return valve 102A is positioned by the valve stem 132A against a valve seat 160A in the lower housing section 206 upon a closing of the return valve 102A. The head 130A of the return valve 102A lifts off of the seat 160A during an opening of the return valve 102A. Also included in the valve assembly 200 is a discharge valve 106A with a stem 126A that extends via a valve guide 214 in the upper housing section 204 to contact a cam 216 on the camshaft 136A. A head 124A of the discharge valve 106A is positioned by the valve stem 126A against a valve seat 150A in the upper housing section 204 upon a closing of the return valve 102A. The head 124A of the discharge valve 106A lifts off of the seat 150A during an opening of the discharge valve 106A.

An exemplary valve retraction spring 218 is shown encircling the stem 132A of the return valve 102A. The upper end of the spring 218 engages in a notch 220 which encircles the stem 132A, and the lower end of the spring 218 pushes against the upper housing section 204 to urge the stem 132A towards the cam 212 to maintain contact with the cam 212, and to seat the valve 102A in its seat 160A upon rotation of the cam 212 to the valve-seating part of the camshaft cycle. Similar arrangements of retraction springs (not shown in FIG. 5) may be provided for respective ones of the valve shafts 114, 120 and 126A for maintaining contact between these valve shafts and their respective cams 140, 142 and 216, and for seating the corresponding valve heads 112, 118 and 126A in their seats when the valves are to be closed.

In accordance with a feature of the second embodiment of the invention, the valve assembly 200 is provided with a holding tank 222 that is located at the interface of the upper housing section 204 with the lower housing section 206, such that a portion of the holding tank 222 is located in the upper housing section 204, and a further portion is located in the lower housing section 206. The head 124A of the discharge valve 106A is portrayed in FIG. 5 as being located in an upper portion of the tank 222 (within the space of the upper housing section 204, above the gasket 208) in an open state of the discharge valve 106A, wherein the valve head 124A is lifted away from the discharge valve seat 150A. During assembly of the valve assembly 200, prior to attachment of the upper housing section 204 to the lower housing section 206, the discharge-valve stem 126A is positioned in the valve guide 214 with the discharge-valve head 124A located in the upper portion of the holding tank 222. Thereafter, a valve retraction spring is attached to the discharge-valve stem 126A to hold the valve head 124A within the upper portion of the holding tank 222. Then the upper housing section 204 can be attached to the lower housing section 206 with the gasket 208 located between the two housing sections 204 and 206, thereby to complete formation of the housing 202. Thereupon, the intake-valve stem 114, the exhaust-valve stem 120 and the return-valve stem 132A are inserted through their respective valve guides and secured by their respective retraction springs to the housing 202.

In the operation of the engine 10A, during the compression stroke, when the return valve 102A is open, the gases driven out of the combustion chamber 13 by the rising piston pass by the return-valve head 130A into an entry port 224, located behind the valve head 130A. The entry port 224 is located off to the side of, and below the holding tank 222 so as to enable a positioning of the return-valve stem 132A outside of the holding tank 222. The entry port 224, along with a passage 226 that connects the entry port 224 to the bottom of the holding tank 222, serve as an entrance to the holding tank 222, via which entrance, the engine gases pass from the combustion chamber 13 to the holding tank 222. During the portion of the operating cycle of the camshaft 136A during which the return valve 102A is open for passage of the engine gases into the holding tank 222, the discharge valve 106A is closed, as has been described above and also in the aforementioned Robinson patent. At a subsequent interval in the operating cycle of the camshaft 136A, when the return valve 102A is closed, the discharge valve 106A opens to allow egress of the engine gases from the holding tank 222 via a discharge port 228, located behind the discharge-valve head 124A, into a conduit 230 that leads to the central chamber 46 (FIG. 2) of the return manifold. Thus the discharge port 228 and the conduit 230 serve as an exit of the holding tank 222, via which exit, the engine gases pass from the holding tank 222 into central chamber of the return manifold.

Figure 6:
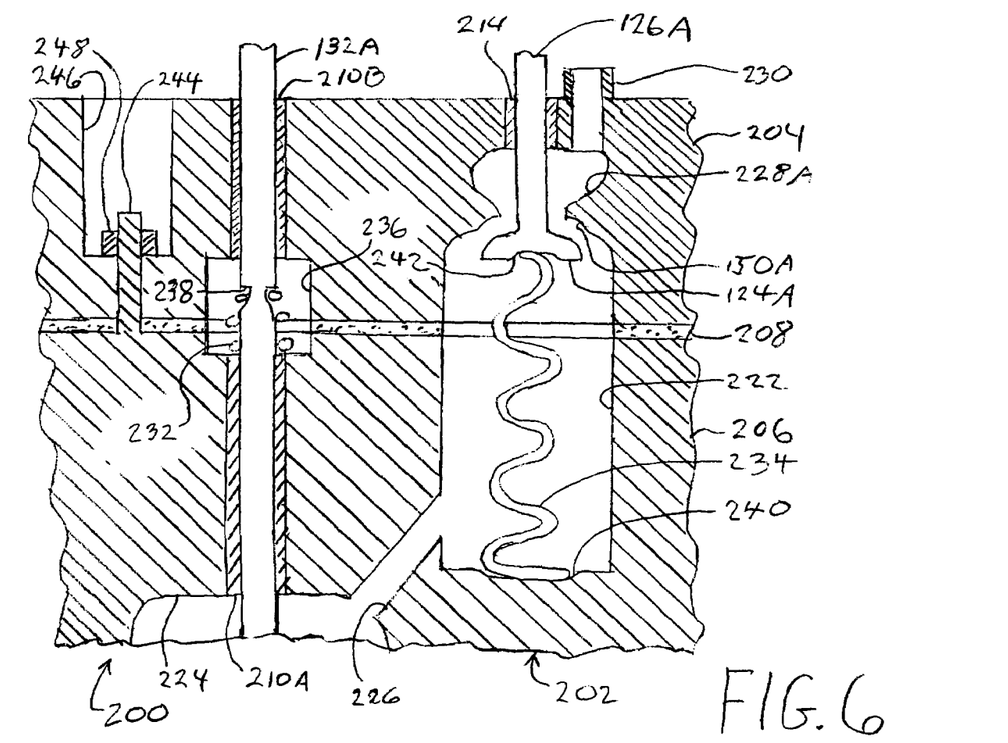
FIG. 6 is a fragmentary view of the valve assembly of the invention showing an optional arrangement of a valve retraction spring for the embodiment of FIG. 5.

FIG. 6 shows a portion of the valve assembly 200 of FIG. 5 to demonstrate a feature of the invention, wherein the splitting of the valve-assembly housing 202 into two sections 204 and 206 enables a repositioning of valve-retraction springs from the top of the housing 202 to a location within the housing 202 at the interface between the two housing sections 204 and 206. This provides for a more compact form for the valve assembly 200, which may be useful in the configuration of an engine. As noted above, the gasket 208 is located between the housing sections 204 and 206, and thus passes along the interface between the housing sections 204 and 206. Two examples of the repositioning of a valve-retraction spring are provided in FIG. 6, namely, the locating of an alternate retraction spring 232 along the return-valve stem 132A for urging the stem 132A upwards toward the camshaft 136A (shown in FIG. 5), and the locating of an alternate retraction spring 234 for pushing the discharge-valve head 124A upwards toward the camshaft 136A. The alternate return-valve retraction spring 232 is located within a void 236 (indicated also in phantom in FIG. 5) constructed partially in the upper housing section 204 and partially in the lower housing section 206. The alternate discharge-valve retraction spring 234 is located within the holding tank 222, which as described above, is constructed partially in the upper housing section 204 and partially in the lower housing section 206.

Upon assembling the housing 202 with the alternate locations of the retraction springs, the return-valve stem 132A is inserted via the entry port 224 into the valve guide 210A so that the stem 132A protrudes from the bottom portion of the void 236. Then the spring 232 is pushed onto the top of the stem 132A and down towards the bottom of the void 236, whereupon the spring 232 engages with a notch 238 in the stem 132A. The spring 232 is then in compression and exerts a compressive force between the notch 238 and the floor of the void 236. The compressive force pulls the valve head 130A (FIG. 5) against the valve seat 160A and locks the valve stem 132A in position in the valve guide 210A. Subsequently, upon installation of the gasket 208 and the upper housing section 204 upon the lower housing section 206, the valve stem 132A extends through the valve guide 210B for contacting the cam 212 (FIG. 5).

Also, upon assembling the housing 202 with the alternate locations of the retraction springs, the discharge-valve retraction spring 234 is positioned within a depression 240 in the bottom of the holding tank 222. The spring 234 is oriented along a vertical axis of the holding tank 222 for subsequent engagement with the discharge-valve head 124A. The discharge-valve stem 126A is inserted via the upper portion of the tank 222 into the valve guide 214 and pushed up until the valve head 124A is in the vicinity of the valve seat 150A. Then, upon installation of the gasket 208 and the upper housing section 204 to the lower housing section 206, the upper end of the spring 234 enters into a depression 242 on the surface of the discharge-valve head 124A to exert a compressive force between the bottom of the tank 222 and the valve head 124A. the compressive force serves to maintain the upper end of the discharge-valve stem 126A in contact with the cam 216 (FIG. 5). The depressions 242, which receives the top of the spring 234, and the depression 240, which receives the bottom of the spring 234, serve maintain the spring 234 in alignment with the tank 222 and the valve head 124A during operation of the engine 110A (FIG. 5).

By way of example in a mode of securing the two housing sections 204 and 206 together with the gasket 208, FIG. 6 shows a threaded bolt 244 (or tie-rod) extending from the lower housing section 206 through the gasket 208 and through a portion of the upper housing section 204 to exit into a cavity 246 of the upper housing section 204. A nut 248 is tightened to the bolt 244, as by use of a socket wrench that fits into the cavity 246, to hold the housing sections 204 and 206 together. Other such bolts (not shown) may be employed at other locations within the housing 202 for securing the housing sections 204 and 206 together with the gasket 208.

Thereby, the invention is readily incorporated into an engine for recirculating a portion of the air-fuel mixture of a gasoline engine (or air without fuel in the case of a diesel engine), withdrawn from the combustion chamber via a return manifold, back to the combustion chamber via an intake manifold. It is noted that the valve assembly of the invention may be incorporated into other mechanical systems wherein an amount of fluid, gas or liquid, is to be received via a first valve, held in a holding tank, and subsequently discharged from the tank via a second valve.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An internal combustion engine comprising:
   a cylinder, a cylinder head, and a piston movable with reciprocating motion within the cylinder, the piston motion providing a succession of four strokes including an induction stroke, a compression stroke, a power stroke and an exhaust stroke, wherein a maximum spacing of the piston from the cylinder head defines a maximum volume of a combustion chamber of the engine, wherein the engine is a gasoline engine or a diesel engine;
   wherein the compression stroke serves to compress a quantity of gas within the combustion chamber in preparation for the power stroke, the compression-stroke gas being a mixture of air and fuel in the gasoline engine, or air without fuel in the diesel engine, the compression stroke providing a reduction in volume of the gas characterized by a compression ratio;
   the power stroke provides for an expansion in volume of a quantity of gas within the cylinder, characterized by an expansion ratio, the gas in the power stroke being a mixture of air, fuel, and products of combustion;
   the engine further comprises a return manifold, and a valve assembly operative to receive from the cylinder a portion of the quantity of the gas contained within the cylinder during the compression stroke and subsequently to discharge the cylinder gas into the return manifold; and wherein the valve assembly has a housing disposed within the cylinder head, and further comprises a holding tank with return valve and discharge valve located within the housing of the valve assembly, the return valve providing fluidic communication between the holding tank and the cylinder, and the discharge valve providing fluidic communication between the holding tank and the return manifold.

2. An engine according to claim 1, wherein each of the return valve and the discharge valve has a valve head and a valve stem supporting the valve head, the valve stems being coaxial.

3. An engine according to claim 2, wherein the valve stems can be displaced relative to each other and to the valve housing by a sliding motion along a common shaft axis.

4. An engine according to claim 3, wherein the valve stem of the return valve is an inner stem disposed within the discharge valve stem that is an outer valve stem of the coaxial arrangement of the valve stems, and distal ends of the inner and the outer valve stems engage with cams of a camshaft of the engine that serve to drive the valve stems toward the engine cylinder upon rotation of the camshaft, and wherein an inner one of the coaxial valve stems is higher than an outer one of the coaxial valve stems to provide clearance from respective ones of the cams.

5. An engine according to claim 4, wherein the valve assembly further comprises two return springs, a first of the return springs contacting the outer valve stem and a second of the return springs contacting the inner valve stem, for retracting the valve stems away from the engine cylinder upon further rotation of the camshaft.

6. An engine according to claim 5, wherein the first return spring encircles the outer valve stem in a recess between the outer valve stem and the housing of the valve assembly, and is compressed by a ridge on the outer surface of the outer valve stem and a ridge on the housing.

7. An engine according to claim 5, wherein each of said valve stems is provided with a window, the second return spring extends from a shelf on one side of the housing of the valve assembly through the windows of respective ones of the valve stems to a further shelf on the opposite side of the housing, and the second valve spring engages with the upper end of the window of the inner valve stem to urge the inner valve stem against its cam.

8. An engine according to claim 1, wherein the volume of the holding tank is equal to approximately one half of the volume of the engine cylinder.

9. An engine according to claim 1, wherein the volume of the holding tank is preset to a value within a range of ten percent of the combustion chamber volume to a value of ninety percent of the combustion chamber volume for gasoline engines and within a range of three percent of the combustion chamber volume to fifty percent of the combustion chamber volume for diesel engines.

10. An engine according to claim 1, wherein the return manifold and the valve assembly constitute a means for reducing the compression ratio to values less than their respective typical values and/or raising the expansion ratio to values greater than their respective typical values; wherein the typical values for gasoline engines is approximately 8:1-10:1, and the typical values for diesel engines is approximately 15:1-22:1.

11. An engine according to claim 1, wherein the reducing means is operative to receive a portion of the quantity of the gas from the cylinder during a first interval of time within the compression stroke and to discharge the quantity of gas to the return manifold during a second interval of time subsequent to the first interval of time.

12. An engine according to claim 1, wherein each of the return valve and the discharge valve has a valve head and a valve stem supporting the valve head, the valve stems of the return and the discharge valves being located transversely of each other in a spaced-apart arrangement and being displaceable relative to each other; and the valve stem of the return valve passes outside of the holding tank to an entrance of the holding tank for controlling a passage of engine gases into the holding tank, and the valve stem of the discharge valve enters an exit of the holding tank for controlling a passage of engine gases out of the holding tank.

13. An engine according to claim 12, wherein the housing of the valve assembly has a first section, and a second section disposed between the first section and the cylinder, and wherein the holding tank is located along an interface between the first section and the second section of the housing.

14. An engine according to claim 13, wherein the valve stem of the return valve passes within both the first section and the second section of the housing to reach the entrance of the holding tank, wherein the valve stem of the discharge valve passes within only the first section of the housing to reach the exit of the holding tank, and wherein the location of the holding tank at the interface of the first and the second sections of the housing permits insertion of the discharge valve into the housing via the exit of the holding tank during construction of the housing.

15. An engine according to claim 14, wherein the valve stems of both the return valve and the discharge valve exit the first housing section in a direction facing a camshaft of the engine, and wherein each of the return-valve stem and the discharge valve stem are provided with a common form of valve-retraction spring, located on a side of the first housing section facing the camshaft, for urging the respective valve stem in a direction toward the camshaft.

16. An engine according to claim 14, wherein the valve stems of both the return valve and the discharge valve exit the first housing section in a direction facing a camshaft of the engine, and wherein each of the return-valve stem and the discharge valve stem is provided with a valve-retraction spring, located at an interface between the first housing section and the second housing section, for urging the respective valve stem in a direction toward the camshaft.

17. A valve assembly for an engine having a cylinder, a cylinder head, and a reciprocating piston within the cylinder, wherein the valve assembly is configured for incorporation into the cylinder head, wherein a maximum spacing of the piston from the cylinder head defines a volume of a combustion chamber of the engine, wherein the valve assembly comprises:

a housing disposed within the head of the cylinder, a holding tank with return valve and discharge valve located within the housing of the valve assembly, the return valve providing fluidic communication between the holding tank and the cylinder, and the discharge valve being operative for providing fluidic communication between the holding tank and a return manifold of the engine;

wherein each of the return valve and the discharge valve has a valve head and a valve stem supporting the valve head, the valve stems of the return and the discharge valves being arranged in a coaxial arrangement and being displaceable relative to each other;

the valve stem of the return valve is an inner stem disposed within the discharge valve stem, and the valve stem of the discharge valve is an outer stem disposed externally to the return valve stem;

the coaxial arrangement of the valve stems positions distal ends of the inner and the outer valve stems to permit engagement with cams of a camshaft of the engine for driving the valve stems upon rotation of the camshaft; and the volume of the holding tank is preset to a value within a range of ten percent of the combustion chamber volume to a value of ninety percent of the combustion chamber volume for gasoline engines and within a range of three percent of the combustion chamber volume to fifty percent of the combustion chamber volume for diesel engines.

18. A valve assembly for an engine according to claim 17, wherein the valve assembly further comprises two return springs, a first of the return springs contacting the outer valve stem and a second of the return springs contacting the inner valve stem, for retracting the valve stems away from the engine cylinder upon further rotation of the camshaft.

19. A valve assembly for an engine according to claim 18, wherein the first return spring encircles the outer valve stem in a recess between the outer valve stem and the housing of the valve assembly, and is compressed by a ridge on the outer surface of the outer valve stem and a ridge on the housing.

20. A valve assembly for an engine according to claim 18, wherein each of said valve stems is provided with a window, the second return spring extends from a shelf on one side of the housing of the valve assembly through the windows of respective ones of the valve stems to a further shelf on the opposite side of the housing, and the second valve spring engages with the upper end of the window of the inner valve stem to urge the inner valve stem against its cam.

21. A valve assembly for an engine having a cylinder, a cylinder head, and a reciprocating piston within the cylinder, wherein the valve assembly is configured for incorporation into the cylinder head, wherein a maximum spacing of the piston from the cylinder head defines a volume of a combustion chamber of the engine, wherein the valve assembly comprises:

a housing disposed within the head of the cylinder, a holding tank with return valve and discharge valve located within the housing of the valve assembly, the return valve providing fluidic communication between the holding tank and the cylinder, and the discharge valve being operative for providing fluidic communication between the holding tank and a return manifold of the engine;

wherein each of the return valve and the discharge valve has a valve head and a valve stem supporting the valve head, the valve stems of the return and the discharge valves being located transversely of each other in a spaced-apart arrangement and being displaceable relative to each other;

the valve stem of the return valve passes outside of the holding tank to an entrance of the holding tank for controlling a passage of engine gases into the holding tank, and the valve stem of the discharge valve enters an exit of the holding tank for controlling a passage of engine gases out of the holding tank;

the spaced-apart arrangement of the valve stems positions ends of the valve stems of the return valve and the discharge valve to permit engagement with cams of a camshaft of the engine for driving the valve stems upon rotation of the camshaft concurrently with a driving of an intake valve and an exhaust valve of the engine; and the volume of the holding tank is preset to a value within a range of ten percent of the combustion chamber volume to a value of ninety percent of the combustion chamber volume for gasoline engines and within a range of three percent of the combustion chamber volume to fifty percent of the combustion chamber volume for diesel engines.

22. A valve assembly for an engine according to claim 21, wherein the housing of the valve assembly has a first section, and a second section disposed between the first section and the cylinder, and wherein the holding tank is located along an interface between the first section and the second section of the housing.

23. A valve assembly for an engine according to claim 22, wherein the valve stem of the return valve passes within both the first section and the second section of the housing to reach the entrance of the holding tank, wherein the valve stem of the discharge valve passes within only the first section of the housing to reach the exit of the holding tank, and wherein the location of the holding tank at the interface of the first and the second sections of the housing permits insertion of the discharge valve into the housing via the exit of the holding tank during construction of the housing.

24. A valve assembly for an engine according to claim 23, wherein the valve stems of both the return valve and the discharge valve exit the first housing section in a direction facing a camshaft of the engine, and wherein each of the return-valve stem and the discharge valve stem are provided with a common form of return spring for urging the respective valve stem in a direction toward the camshaft.

* * * * *